United States Patent [19]
Zmuda et al.

[11] 3,807,173
[45] Apr. 30, 1974

[54] EXHAUST REACTOR FOR COMBUSTION ENGINE

[75] Inventors: Andrew W. Zmuda; Yu K. Pei, both of Toledo, Ohio

[73] Assignee: Owens-Illinois Inc., Toledo, Ohio

[22] Filed: Mar. 23, 1971

[21] Appl. No.: 127,127

[52] U.S. Cl............... 60/302, 60/282, 23/277 C, 23/288 F, 252/477
[51] Int. Cl............................................... F01n 3/14
[58] Field of Search......... 60/282, 299, 302; 23/2 E, 23/277 C, 288 F; 252/477

[56] References Cited
UNITED STATES PATENTS

| | | | |
|---|---|---|---|
| 1,789,812 | 1/1931 | Frazer | 23/2 E |
| 3,059,420 | 10/1962 | Schnabel | 60/290 |
| 3,059,421 | 10/1962 | Schnabel | 60/303 |
| 3,302,394 | 2/1967 | Pahnke | 60/302 |
| 3,362,783 | 1/1968 | Leak | 252/477 R |
| 3,441,381 | 4/1969 | Keith | 23/277 C |
| 3,502,596 | 3/1970 | Sowards | 23/2 E |
| 3,507,627 | 4/1970 | Frant | 252/477 R |

FOREIGN PATENTS OR APPLICATIONS

| | | | |
|---|---|---|---|
| 1,442,587 | 10/1968 | Germany | 252/477 R |

*Primary Examiner*—Douglas Hart
*Attorney, Agent, or Firm*—Charles S. Lynch; E. J. Holler

[57] ABSTRACT

An exhaust reactor for reducing the amount of environment pollutants including hydrocarbons, carbon monoxide, oxides of nitrogen, and the like, introduced into the atmosphere with the exhaust gases normally produced and emitted by a combustion engine. The reactor illustrated has a longitudinally extending first reaction zone which receives the high-temperature combustion gases directly from the engine cylinder and permits combustion of at least a substantial portion of the pollutants therein, and a second reaction zone disposed about the first zone and supporting the first zone within the reactor housing. The second zone is formed by a plurality of tubes of relatively small diameter extending longitudinally of and disposed around the first reaction zone. The tubes support the housing of the first reaction zone and, together with such housing, form a monolithic reaction core. The monolithic core is insulated and, in a preferred embodiment, a peripheral portion of the monolithic core has a layer of tubes which do not receive the hot exhaust gases and thus act as the insulating barrier for the reaction zones. The portion of the small tubes forming passageways for the gases comprises the second reaction zone, and, when these tubes are made of a crystalline oxide ceramic material, they act as solid contact catalytic surfaces which promote combustion of the pollutants therein before the gases exhaust from the second reaction zone into the atmosphere.

17 Claims, 14 Drawing Figures

PATENTED APR 30 1974 3,807,173

INVENTORS
ANDREW W. ZMUDA
YU K. PEI

BY E. J. Holler and
Charles A. Lynch
ATTORNEYS

PATENTED APR 30 1974　　　　　　　　　　　　　3,807,173

EXHAUST REACTOR FOR COMBUSTION ENGINE

During the operation of a combustion engine such as an internal combustion engine of an automotive vehicle, fuel drawn into the top of each of the cylinders is ignited sequentially by the spark plugs and the expanding gases thus formed in the cylinders provide the driving force for the pistons. The combustion products formed as the fuel burns in the cylinders include hydrocarbons, carbon monoxide, oxides of nitrogen and, when leaded fuel is used, various lead-containing compounds. While the temperature within each of the cylinders of the engine is extremely high at the time of spark plug ignition, usually in the neighborhood of 3000° F., the combustion gases rapidly cool as they leave the cylinder and pass through the manifold, the exhaust pipe and muffler, and out the tailpipe of the vehicle. This rapid cooling of the combustion gases interferes with the further combustion of the engine effluent gases carried thereby and results in the entry of the hydrocarbons, carbon monoxide, oxides of nitrogen, and the like, into the atmosphere, thus polluting the environment.

It has been known that if the temperature of the combustion gas effluent from a combustion engine can be maintained at a high enough level for a sufficient period of time after the gases leave the primary combustion zone, a substantial portion of the combustion products therefrom can be burned, thus decreasing the amount of pollutants, particularly CO and hydrocarbons, entering the atmosphere.

Exhaust reactors for combustion engines, including internal combustion piston engines, have been known in the art. These reactors have been used in an attempt to maintain the combustion gases at high temperatures for a time sufficient to provide at least partial conversion of the initial combustion products to less objectionable products. Some of these reactors have been made of metals and have included one or more passageways through which the high-temperature combustion gases pass before entering the atmosphere. Prior art metal reactors have a great number of disadvantages, including being limited to lower operating temperatures than is desirable for the successful combustion of pollutants. Also, such metal reactors have been fairly expensive to manufacture, especially if they are constructed of metals that will withstand such high temperatures for an appreciable time.

Exhaust reactors having a large, open ceramic cylinder forming a reaction zone have also been known. However, during the operation of engines equipped with such reactors, the vibrations encountered are such that the ceramic or the means for supporting it in the metal outer housing fails mechanically, resulting in a complete loss of the reactor. Such ceramic reactors have not been reliable for the intended purpose.

Accordingly, it is an object of this invention to provide an exhaust reactor for a combustion engine which can obviate the disadvantages presently found in known reactors.

Another object of this invention is to provide an exhaust reactor for a combustion engine which will withstand the severe vibrations normally occurring during the operation of the vehicle powered by such engine.

Another object of the preferred embodiment of this invention is to provide an exhaust reactor for a combustion engine which will have a fast heat-up time and will retain heat throughout its reaction zones, which zones are of a length sufficient to ensure the desired combustion of the exhaust gases from the engine.

Another object of this invention is to provide an exhaust reactor for a combustion engine which will withstand high temperatures, resist oxidation and chemical attack, and resist damage from thermal shock.

It is a further object of this invention to provide an exhaust reactor for a combustion engine which is inexpensive to make, and which improves the combustion of the exhaust gases passing therethrough so as to reduce drastically the emission of the major pollutants into the atmosphere.

Still a further object of this invention is to provide an exhaust reactor which is insulated against heat loss while retaining the heat of combustion therein. Such heat retention results in more economic combustion and reduction of pollutants from the exhaust gases; moreover such insulation helps minimize the high temperatures existing under the hood of the engine in such an automobile or truck.

It is another object of this invention to provide an exhaust reactor having a compact design and a resilient structure which performs its function over an extended period of time without failure of its component parts.

In attaining the objects of this invention, one feature resides in providing an exhaust reactor comprising a first reaction zone which receives the hot combustion gases from the engine, and a second reaction zone comprising a plurality of longitudinally extending tubes of extremely small diameter, which tubes form a plurality of layers about the first reaction zone. An important feature of the preferred embodiment of the invention is that the layers of tubes about the outer periphery of the second reaction zone of the exhaust reactor are sealed off to the entry of gases therethrough and thus act as an insulating layer for the hot gases in the reactor.

Other objects, features and advantages of the invention will become apparent from the following description of the invention when taken in conjunction with the accompanying drawing, wherein.

Figures 1, 2, 3:
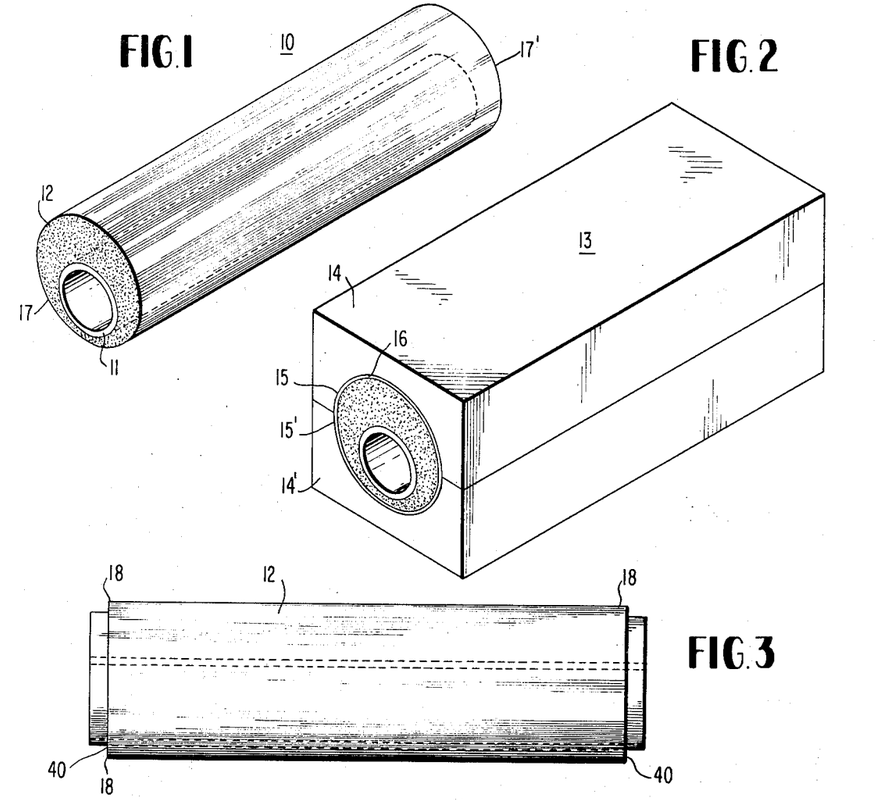
FIG. 1 is a perspective view of a tube assembly from which the inner core of an exhaust reactor of the invention is to be formed.
FIG. 2 is a perspective view of a mold utilized in making the core of FIG. 1.
FIG. 3 is a plan view of the tube assembly of FIG. 1, wherein the tubular members about the periphery of each end thereof have been cut away.

As may be seen in FIGS. 1 and 2, the core assembly 10 consists of an inner tubular member 11 having a plurality of longitudinally extending tubes 12 disposed about and completely surrounding member 11. Tubes 12 are fused or bonded to each other and to tubular member 11 so as to form an integral or monolithic structure.

One way of making the core assembly 10 is to utilize a split mold 13 having top and bottom members 14, 14', each provided with an arcuate mold cavity 15, 15', such that when the mold is closed a cylindrical chamber or cavity is formed. After lining the mold cavity with a heat-resistant liner 16, the mold cavity is packed in such a manner that the tubes 12 completely surround tubular member 11. The assembly is then subjected to sufficient heat and pressure to bond or fuse the tubes and tubular member together into an integral or monolithic structure. The heat-resistant liner 16, which serves as a parting member or layer, may be an asbestos cloth and the presence of the liner facilitates the separation of the monolithic structure from the mold 13.

Figure 8:
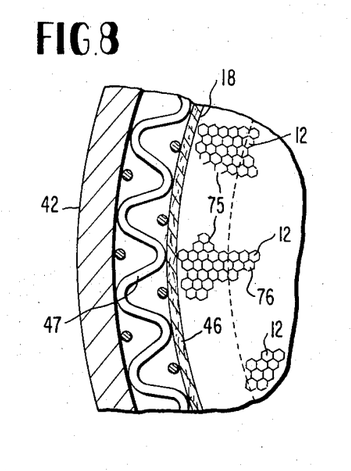
FIG. 8 is an enlarged view of a portion of the thermal reactor of FIG. 7 adjacent the housing and showing the several components in their relative positions with respect to the reactor housing.

In a preferred embodiment of the invention, the tubular member 11 and tubes 12 are formed of a thermally crystallizable glass which, after fusion of contacting surfaces occurs in the mold and a monolithic structure is formed, are subsequently heat-treated to form an at least partially crystalline inorganic oxide ceramic material commonly referred to in the art as a glass-ceramic. The tubes 12 are sealed at each end so that a fluid, such as air is entrapped therein. A plurality of thin, elongated, hollow tubes 12 are stuffed in closely-packed parallel relationship into the mold 13 about member 11, as illustrated in FIG. 2. The mold is then placed in an appropriate oven and the thermally crystallizable glass tube and tubular members are subjected to heat sufficient to soften the glass walls of the tubes causing the fluid medium within each of the tubes to expand and to bloat the tubes outwardly so that adjoining contacting surfaces of the tubes fuse together to form a unitary structure, with the tubes located adjacent the tubular member 11 being fused thereto. The expansion of the tubes by the expansible fluid medium sealed therein is important. Even if the actual expansion or reshaping of the tubes by the pressure of the hot expansible medium or gas is small, the pressure exerted forces adjacent surfaces into contact and is important to obtaining proper fusion of the tubes. Where desired, the expansion can be effected to expand and reshape circular tubes, for instance, into a desirable hexagonal shape, as illustrated in FIG. 8. Such expansion or bloating of the tubes 12 preferably removes substantially all of the interstices therebetween, and a foraminous assembly is formed about the tubular member 11. The process and techniques for bloating and fusing the thermally crystallizable tubes into a monolithic structure and heat-treating them to form the crystalline oxide glass-ceramic assembly is disclosed in co-pending U.S. application Ser. No. 30,859 filed April 22, 1970, and assigned to the same assignee as this application, and applicants incorporate herein by reference the disclosure of said co-pending application.

The heat-treated core assembly 10 is then removed from the oven and, after cooling to room temperature, has each of its ends 17,17' cut a fraction of an inch or so, sufficient to open each of the fused tubes which now form a plurality of passageways through the assembly. This can be done by use of a glass-cutting saw as is well-known in the glass industry. The core assembly 10 is then placed in an oven and heat-treated at the temperatures required and for the periods of time sufficient to convert the crystallizable glass tubes 12 and member 11 into a partially crystalline inorganic oxide ceramic material.

Several layers of tubular members 12 about the periphery 18 of the glass-ceramic assembly 10 thus formed are removed, as by cutting, at each end of the assembly, so that the fused tubes 12 about the outer periphery of the core assembly 10 are of a length shorter than the remaining fused tubes 12 and tubular member 11, as illustrated in FIG. 3.

Figure 4:
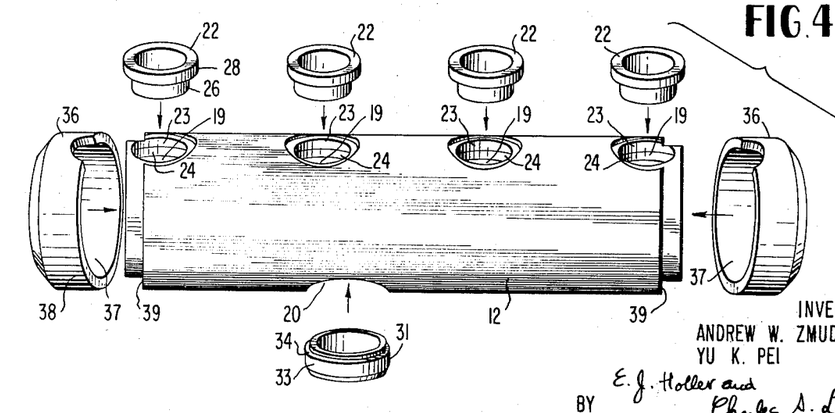
FIG. 4 is an exploded plan view of an embodiment of the core assembly of the reactor of the invention, showing the inlet and outlet ports for the gases.

As may be seen in FIG. 4 of the drawing, the glass-ceramic core assembly 10 has a plurality of inlet openings 19 and an outlet opening 20 formed therein by removing the several layers of fused tubes by cutting therethrough. As better seen in FIG. 5, the inlet openings 19 extend directly into and through the tubular member 11, while the outlet opening 20 may be cut to any depth through the plurality of layers of tubes 12 in the core assembly up to the outer surface 21 of the member 11. A sleeve 22 is disposed within each of the openings 19 and is securely fastened or bonded to the ends 23 of the tubes 12 and the periphery 24 of the opening cut through the member 11, such as by a thermally crystallizable sealing glass. Each sleeve 22 has its inner wall area defining an inlet port 25 with the body 26 of the sleeve of a length such that it depends inwardly into the interior 27 of tubular member 11. The upper part of the sleeve 22 is provided with an integral shoulder portion 28 of a size sufficient to permit the shoulder 29 to be in contact with and be sealed to the member 11 adjacent the periphery 24 of the opening through the member 11. While the body 26 of the sleeve 22 is shown extending into the interior of tubular member 11, the body can be made to be flush with the inner wall surface 30 of member 11. A sleeve 31 is also provided for outlet opening 20 and is bonded therein in the same manner described above for sleeve 22. Sleeve 31 has a relatively short body 32 and an integral shoulder portion 33 with shoulder 34 in contact with and sealed to the adjacent tubes 12. Passageways of tubes 12 about opening 20 communicate with the outlet port 35 defined by sleeve 31. When end caps 36, also made of thermally crystallizable glass and heat-treated to form a glass-ceramic, are inserted over each end of the core assembly 10 and sealed or bonded thereto in the same manner as sleeves 22 and 31 with a thermally crystallizable sealing glass, the inner core assembly for the exhaust reactor is then ready for insertion in an appropriate housing to be mounted on a combustion engine adjacent the primary combustion zone.

Figure 5:
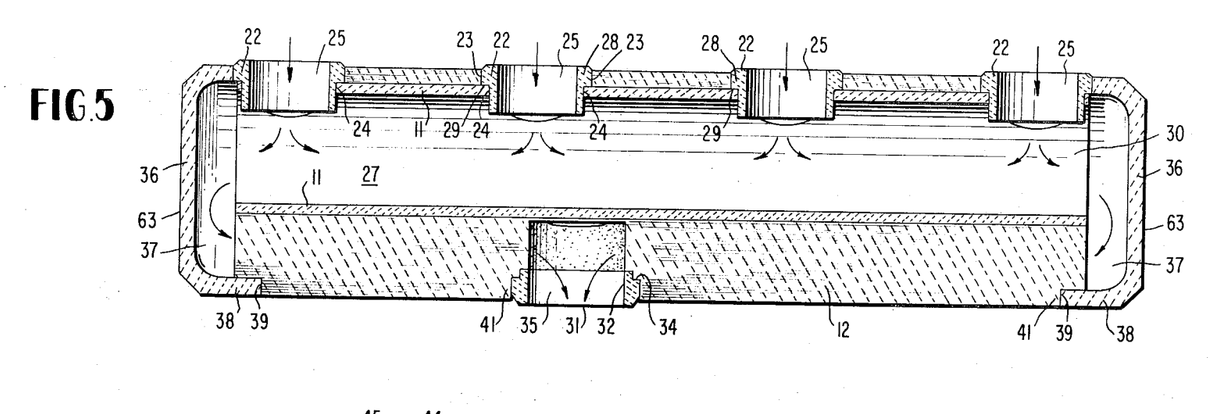
FIG. 5 is a longitudinal cross-sectional view of the core assembly of FIG. 4 taken along lines 5–5 of FIG. 7.

End caps 36 are cup-shaped and the interior of each cap defines a chamber 37 which encompasses all of the end of tubular member 11 and a very substantial portion of the ends of tubes 12. The thickness of the rim 38 defining the outer periphery 39 of end cap 36 corresponds to the thickness of the cut 40 about the periphery 18 of the core assembly so that when the cap is in place the periphery 39 of the cap is co-extensive with the periphery 18 of the core assembly, as shown in FIG. 5. This ensures a tight bonding of the end cap to the inner core along all contacting surfaces of the two bodies. As will be appreciated, those tubes 12 which have their ends in contact with the rims 38 of the end caps 36 will have their passageways blocked to the flow of exhaust gases. The same is true of those tubes 12 shoe ends come into contact with the body or shoulder portions of sleeves 22 and 31.

As seen from FIG. 5, combustion gases enter each of the inlet ports 25 into the interior 27 defined by the inner wall surface area 30 of tubular member 11, and then flow in either direction out of member 11 and into the chambers 37 defined by the end caps 36 and into the passageways of tubes 12 which, in turn, are connected with the outlet port 35. Air is also introduced into tube 11, such as through inlet ports 25 by means not shown, to assist in further burning of the gasses. Thus, the interior 27 of tubular member 11 acts as a first reaction zone wherein the combustion gasses from the primary engine combustion zone, such as the cylinder of an internal combustion piston engine, entering at high temperatures continue to burn as they flow along the zone 27 into the chambers 37 of the end caps 36, and flow through the open passageways of tubes 12 which are in communication with outlet port 35.

One important advantage in making the first and second reaction zones of the thermal reactors of at least partially crystalline inorganic oxide ceramic material is the low thermal conductivity of such materials. Because the flow or conduction of heat along the length of the tubes made from this material is at a minimum, and preferably less than 0.01 cal/cm$^2$/sec/cm/° C at 400° C, the reaction zones are heated almost immediately upon entry of the hot combustion gases from the engine and the heat is retained by the structure of the core assembly. This insures combustion of the engine effluent gases as they pass through the reaction zones.

As the flow of hot combustion gasses and the products of further combustion which are produced make a 180° turn within the chambers 37 to enter the passageways of the tubes 12, turbulence is created which provides continued good mixing of unburned gases and air. Further turbulence occurs within the first reaction zone 27 as the gases entering the inlet ports 25 and flowing in both directions are continuously meeting with gases subsequently entering the ports 25 and seeking their particular flow paths.

The layer of tubes 12 located about the outer periphery 18 of the core assembly 10 have their ends 41 blocked to the entry of the combustion gases since these ends 41 are in contact with the rims 38 of end caps 36. Thus, the tubes 12 around the periphery 18 of the core are, in effect, sealed, and provide an insulating layer of tubes around the core assembly 10 so that the temperature at the exterior of the assembly core is considerably lower than that of the interior.

While in the preferred embodiment the outer layer of tubes is closed to the passage of combustion gases therethrough and acts as an insulating layer, it is to be understood that insulating materials capable of withstanding the high operating temperatures of the inner core assembly and the reaction zones may be substituted for such closed tubes, which insulating layer will assist in preventing the conduction of the heat from the inner core to the metal housing of the thermal reactor. By keeping the metal housing of the reactor relatively cool, due to the insulating layer—whether it be closed tubes or insulating material—the heat under the hood of the automotive vehicle and the temperature of all of the automotive components usually found under such a hood are kept at a low enough level as not to cause any damage to the engine or such components.

Figure 6:
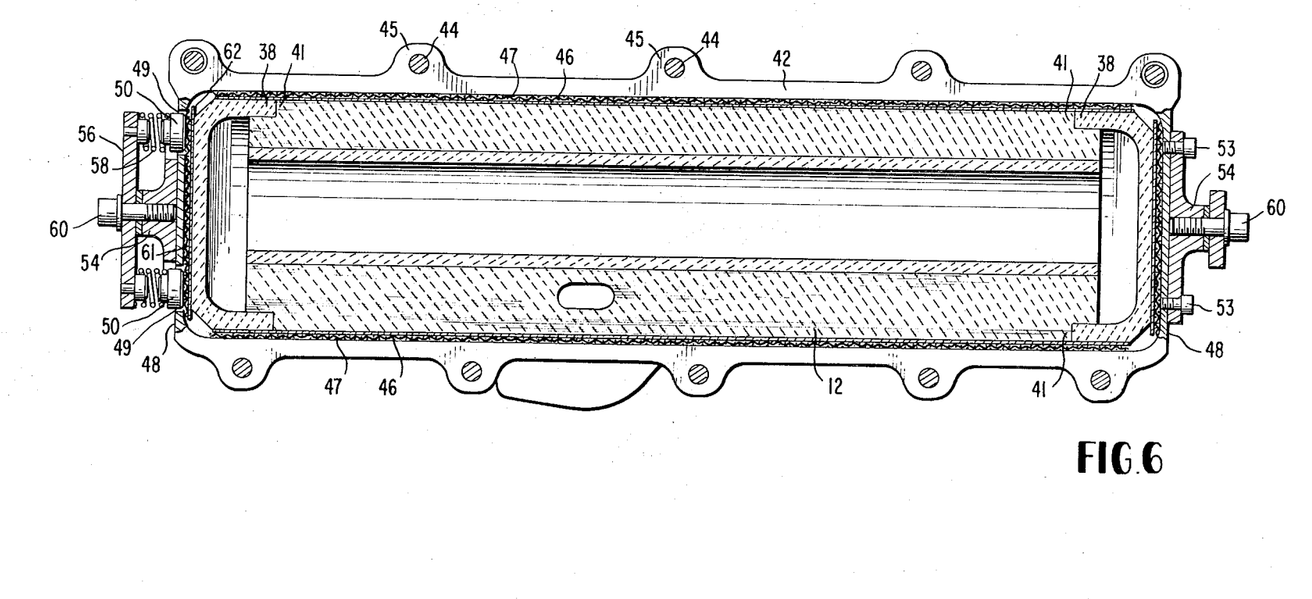
FIG. 6 is a longitudinal cross-sectional view of the exhaust reactor of the invention taken along lines 6–6 of FIG. 7.

The core assembly illustrated in FIG. 5 is inserted into a cylindrical metal housing 42 as illustrated in FIG. 6. Cylindrical housing 42 consists of two hemicylindrical mating members 43, 43' (see FIG. 7), which are securely fastened together by bolts (not shown) passing through openings 44 in ears 45 integral with the members 43, 43'. Prior to inserting the core assembly into the housing 42, a gasket material, such as a metal-reinforced sheet asbestos gasket material 46, is wrapped around the outer periphery of the core assembly 10, and a woven spring mesh 47 is subsequently wrapped around and secured about the gasket material 46.

Figures 9, 10:
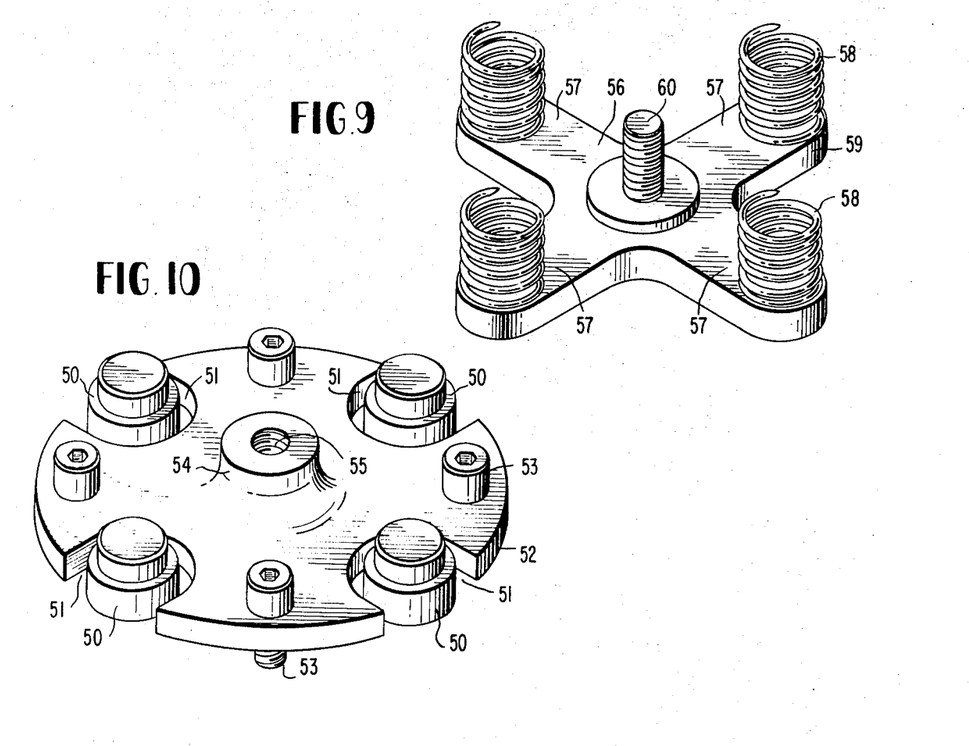
FIG. 9 is a perspective view of one embodiment of the fastening means utilized in maintaining the core assembly within the reactor.
FIG. 10 is a perspective view of the bracket and button members which cooperate with the fastening means of FIG. 9 to maintain the core assembly within the reactor.

When the exhaust reactor core assembly is formed of a glass-ceramic material having an extremely low coefficient of thermal expansion, preferably zero expansion, and the housing 42 is of metal, such as cast iron, the expansion properties of the two materials are so vastly different that the inner core assembly would be damaged if it were securely fastened to the metal housing because of the differences in relative movement as each material became heated and expanded differentially. Accordingly, it is necessary to have the core assembly 10 "float" within the housing so that one can compensate for the expansion of the metal housing when the engine is running and the subsequent contraction when the engine is shut off and the housing is cooled. This "floating" is accomplished in the illustrated embodiment by providing the ends 48 of housing 42 with a plurality of openings 49 which receive buttons 50 disposed within arcuate slots 51 of bracket 52. Bracket 52 is mounted upon and secured to ends 48 of the housing by screws 53. Bracket 52 is provided with a raised center portion 54 which projects outwardly relative to the end 48 of the casing and is provided with a threaded opening 55 (see FIG. 10). Mounted on bracket assembly 52 is spider 56 having four arms 57 with a spring 58 mounted on the end 59 of each arm. Fastener 60 is threaded into the opening 55 of the bracket 52 and secures the spider 56 thereto.

Each of springs 58 is in contact with button 50 and applies a force to the button which, in turn, applies pressure to the end cap 36 of the core assembly. While the ends of caps 36 are under a pressure of about 25 p.s.i., the pressure applied thereto can be increased or decreased to securely hold the core in position.

As shown in FIG. 6, an insulating sheet material 61, such as quartz cloth, is disposed adjacent a sheet of metal-reinforced asbestos material 62 with the latter being in contact with the end cap 36 from the end 48 of the housing 42 and thus keep the heat which is transferred to the buttons 50 to a minimum.

Since the metal casing 42, when heated, expands not only longitudinally but in all directions, thus also increasing its inner and outer diameters and moving outwardly relative to the core, a resilient spring mesh 47 is provided about the exterior surface or periphery 18 of the core assembly 10, which spring mesh is in direct contact with the inner surface of the casing. This mesh 47 is advantageously a woven material made of stainless steel, Inconel X, or equivalent heat-resistant material which has been heat-treated to maintain its resiliency over an extended period of time at the high temperatures encountered in the exhaust reactor. Note, however, that because of the insulation about the periphery of the core member 10, provided by the tubes 12 which are closed to the passage of gases, the temperature reached by the spring mesh metal 47 does not become too high for the metal to retain its resiliency. Thus, the spring mesh 47 is under contraction between the core and the housing when the housing is at ambient temperature. As the inner diameter of housing 42 expands, the resilient spring mesh also expands to fill the increased space while at the same time maintaining the reactor core assembly in its position relative to the housing. Thus, as can be understood by one skilled in this art, the inner core assembly 10 illustrated in FIG. 6 "floats" within the housing 42 so that any expansion in length or diameter of the housing is compensated for by the action of the springs 58 and buttons 50 at each end of the housing and by the resilient spring mesh 47 disposed about the core assembly within the housing. In the embodiment illustrated in FIG. 6, the spring mesh 47 exerts a pressure of at least 150 p.s.i. about core assembly 10. One skilled in the art, however, should be able to ascertain the amount of pressure to be exerted on the core assembly and utilize a spring mesh of the proper weave and flexibility.

Figure 7:
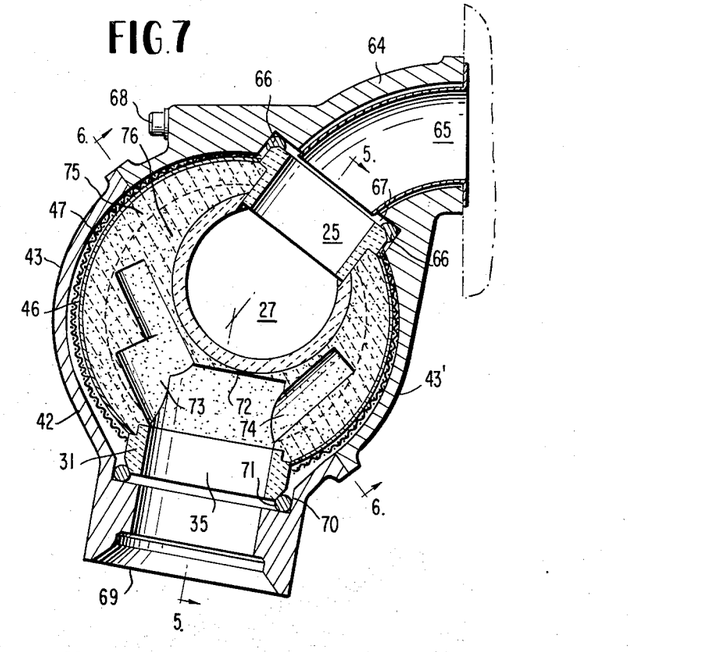
FIG. 7 is a sectional view through an embodiment of the thermal reactor of the invention.

As seen in FIG. 7, the housing 42 is provided with a plurality of arms 64 which are secured to the engine exhaust ports on one side of a combustion engine (not shown) so that the hot combustion gases leaving the primary combustion zone of the engine immediately enter inlet passageway 65 defined by arm 64 and inlet 25 of the core assembly 10 to the first reaction zone 27. A resilient gasket, such as O-ring 66, is provided between the tapered top surface of sleeve 22 and the recessed portion 67 of arm 64 adjacent the juncture of inlets 65 and 25. Casing 42 is adapted to be affixed to the engine block by bolts 68 extending through passageways (not shown) on either side of arms 64.

Casing or housing 42 is also provided with an outlet port 69 which communicates with outlet port 35 of the core assembly, Again, in order to space the core assembly 10 from the interior of the casing and to permit movement relative thereto, a resilient gasket, such as an O-ring 70, is provided between the tapered outer surface of sleeve 31 and the recessed portion 71 of the arm 64 defining outlet port 69.

As seen in FIG. 7, outlet port 35 in core assembly 10 is formed by cutting away a portion of the tubes 12 up to the outer surface 72 of tubular member 11. To provide for even more tubes 12 having passageways connecting with outlet port 35, layers of other tubes 12 are cut at an angle to outlet passage 17, as shown by passageways 73 and 74 communicating with outlet 35. While it is desirable to have as many of the tubes 12 communicating with the outlet ports 35, 69, care should be taken that the size of the passageways 73, 74 is not such as to penetrate the blocked peripheral insulating tubes.

In FIG. 8, which is an enlarged section of a portion of the thermal reactor shown in FIG. 7, one can readily ascertain the relationship of the outer casing 42 to the resilient spring mesh 47 overlying the insulating material 46 which covers the periphery 18 of core assembly 10, with the outer layers 75 of tubes 12 being closed to the passage of combustion gases and the inner layers 76 of tubes 12 having passageways connecting with the outlet port 35 and the passageways 73, 74.

Figure 11:
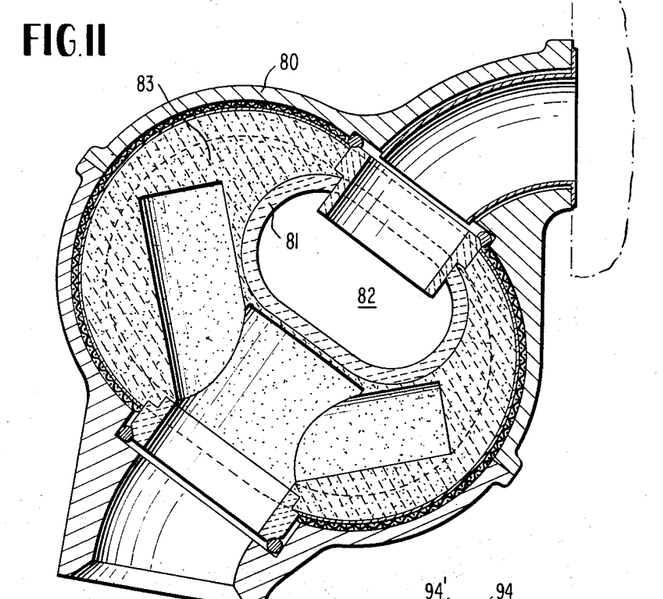
FIG. 11 is a sectional view of another embodiment of the thermal reactor of the invention.

Since the space under the hood of many automobiles being manufactured today is limited, it may be preferred to make the exhaust reactor of the invention with an oval configuration such as that illustrated in FIG. 11. Casing 80, inner tubular member 81 which defines the first reaction zone 82, and the integral core assembly 83 are made in an oval configuration. Core assembly 83 consists of member 81 and a plurality of tubes 84 surrounding member 81 and bonded or fused to each other and to tubular member 81. The remainder of the structure of the exhaust reactor can be the same as illustrated in FIGS. 4–7.

To make one embodiment of the thermal reactor illustrated in FIGS. 4–7, namely a glass-ceramic reactor, a thermally crystallizable glass tubular member 11 having a diameter of 2 inches and a length of 18 inches was placed off center into mold 13 together with a plurality of annular tubes 12 formed of the same thermally crystallizable glass and having a length of 18 inches, an inner diameter of 0.062 inches, and a wall thickness of .004–.006 inches. Each of the tubes 12 had its ends sealed, air trapped therein, and the tubes were closely packed in parallel relationship to each other and to the tubular member 11.

The thermally crystallizable glass composition of tubular member 11 and tubes 12 consisted essentially of the following ingredients:

| | % by Weight |
|---|---|
| $SiO_2$ | 70 |
| $Al_2O_3$ | 19.8 |
| $TiO_2$ | 1.5 |
| $ZrO_2$ | 1.6 |
| $Sb_2O_3$ | 0.5 |
| $ZnO$ | 1.7 |
| $Li_2O$ | 3.8 |
| $Na_2O$ | 0.5 |
| $K_2O$ | 0.2 |
| F | 0.3 |
| Cl | 0.1 |

An asbestos liner 14 had been placed about the periphery of the cavity of the mold 13 prior to the placing of the tubes therein. The split mold was then weighted and placed in an oven and subjected to the following temperatures for the indicated periods of time:

| Heating Rate | Temperature | Holding Time (Hours) |
|---|---|---|
| 150°F/hr. to | 1300°F. | 0 |
| 10°F/hr. to | 1350°F. | 24 (at 1350°F.) |
| 10°F/hr. to | 1500°F. | 0 |
| 25°F/hr. to | 1800°F. | 6 |
| 300°F/hr. (approx) to | Room Temperature | |

The foregoing heat treatment caused the air within each of the tubes to build up pressure and to expand, thus bloating the tubes and causing the outer walls of adjacent tubes to fuse together and the outer walls of those tubes adjacent to the outer surface of the tubular member 11 to be fused thereto. A monolithic structure was formed. The ends of the core assembly were cut off with a diamond saw thus opening each of the tubes. The assembly was then removed from the mold and placed in a horizontal position in a kiln with a sand support around the base of the assembly to prevent any sagging. The core assembly was then subjected to the following heat treatment of the indicated temperatures for the indicated times:

| Heating Rate | Temperature | Holding Time (Hours) |
| --- | --- | --- |
| 300°F/hr. to | 1800°F. | 0 |
| 50°F/hr. to | 2100°F. | 4 (at 2100°F.) |
| 50°F/hr. to | 1500°F. | 0 |
| Furnace Rate to | Room Temperature | |

During the second heat treatment stage, the thermally crystallizable glass tubes and tubular member crystallized to an opaque glass-ceramic.

Several layers of the fused glass-ceramic tubes disposed about the periphery at the ends of the core were cut to form the structure illustrated in FIG. 3. Annular openings were then cut in the core assembly to form the structure illustrated in FIGS. 4 and 5. Inlet openings 19 were cut through the outer periphery of the tubes of the core 10 with the inlet openings extending through the wall of tubular member 11 to provide communication between the inlet openings 19 and the interior 27 of the glass-ceramic tubular member. Outlet opening 20 was cut to the exterior surface of member 11 within the core 10. A plurality of glass-ceramic sleeves 22 and 31 of the same composition as glass-ceramic tubes 12 and member 11 had their outer surfaces coated with a thermally crystallizable sealing glass and were inserted in the respective openings 19 and 20 of the core member 10. Glass-ceramic end caps 36, also of the same composition as sleeves 22 and 31 had the portions of their inner surfaces which were to come in contact with the core member 10 also coated with the same thermally crystallizable sealing glass, and were then mounted on the core assembly as illustrated in FIG. 5. The assembly, including the core member 10, end caps 36, and sleeves 22, 31, was then placed in a kiln and subjected to the following sealing heat treatment, which sealed the assembly to a monolithic structure and converted the sealing glass to a low-expansion glass-ceramic.

| Heating Rate | Temperature | Holding Time (Hours) |
| --- | --- | --- |
| Room Temperature to | 230° F. | 1.25 (at 230°F) |
| 250°F/hr. to | 600° F. | 0 |
| 56°F/hr. to | 950° F. | 0 |
| 197°F/hr. to | 2135° F. | 3 (at 2135°F.) |
| Furnace Rate to | Room Temperature | |

As a result of the heat treatment step indicated above the end caps and sleeves were securely sealed to the tube assembly, forming a complete nonolithic structure, ready for final assembly in the metal housing 42.

The sealing glass composition used in making the monolithic structure described above was a thick slurry mixture of two glass-ceramic frits, using 60 percent of Frit A and 40 percent of Frit B, each of which was thermally crystallizable, ground to a size of less than 200 mesh.

The thermally crystallizable glass frits used in the mixture had the following weight percent compositions:

| Glass Frit A | | Glass Frit B | |
| --- | --- | --- | --- |
| $SiO_2$ | 75.6 | $SiO_2$ | 53.8 |
| $Al_2O_3$ | 16 | $Al_2O_3$ | 27.3 |
| $TiO_2$ | 1.8 | $Li_2O$ | 6.9 |
| $ZrO_2$ | 1.4 | $B_2O_3$ | 4.6 |
| $Li_2O$ | 4.7 | $ZnO$ | 1.5 |
| $Na_2O$ | 0.5 | $MgO$ | 1.9 |
| | | $BaO$ | 1.5 |
| | | $CaO$ | 0.4 |
| | | $K_2O$ | 1.2 |
| | | $Na_2O$ | 0.5 |
| | | $TiO_2$ | 0.1 |
| | | $Fe_2O_3$ | 0.1 |

One-hundred eighty grams of Frit A and 120 grams of Frit B were dry mixed by tumbling for one hour in a one-gallon size porcelain ball mill. One third of the volume of the mill was filled with 1" diameter alumina balls. A thick slurry of the above mixture was made by adding the following solution in the proportions indicated:

250 ml. water
25 ml. ethylene glycol
82.5 grams Monsanto 40–20 polyvinyl chloride.

The sealant was applied with a brush in a uniform, even coat to each mating surface of the inlet and exhaust sleeves 22, 31, the end caps 36, and to the companion mating surfaces of the matrix core. In order to slide the respective parts easily into their proper locations, water was applied with a brush to the mating joints to soften the sealant as the parts were slid in place. Finally, the entire outer skin surface 18 of the core assembly was coated with a uniform, thin layer of the sealant material. The purpose was to obtain a stronger outer skin layer for greater resistance to damage during handling. The entire coated assembly was placed in an oven at a temperature of 150° F. to drive out all of the moisture prior to the sealing heat treatment described above which sealed the assembly to monolithic structure and converted the sealing glass to a low-expansion glass-ceramic.

A thermal reactor of the construction shown in FIGS. 5–7 and containing the core assembly described above was affixed to an internal combustion engine. The exhaust emission coming from the reactor at the start up of the cold engine, and, periodically, as the engine ran, or was accelerated or decelerated for short periods of time, was separately collected and analyzed for hydrocarbon, carbon monoxide, carbon dioxide, and nitrogen oxides. The amounts of hydrocarbons, carbon monoxide and nitrogen oxides were found to be considerably reduced compared to the amounts normally emitted by the engine.

Well suited for use in making the core assembly or matrix of this invention are thermally crystallizable glasses that are convertible by heating to glass-ceramic bodies. As used herein, a glass-ceramic is an inorganic, essentially crystalline oxide ceramic material derived from an amorphous inorganic glass by in situ bulk thermal crystallization.

Prior to thermal in situ bulk crystallization, the thermally crystallizable glasses can be drawn into tubing using conventional glass forming techniques and equipment. After being assembled in the manner shown in FIG. 2, the thermally crystallizable glass tubes are subjected to a controlled heat treatment until the tubes have been expanded and fusion sealed and crystallization has been effected.

Thermally crystallizable glass compositions and the glass-ceramics resulting from thermal in situ crystallization thereof which are useful in the method and product of this invention are those which have, in their crystallized state, a coefficient of thermal expansion in the range from $-12$ to $+12 \times 10^{-7}/°$ C over the range 0–300° C. The compositions usually used are those containing lithia, alumina and silica, together with one or more nucleating agents including $TiO_2$, $ZrO_2$, $SnO_2$ or other known nucleating agents. In general, such compositions containing in weight percent about 55 to 75 $SiO_2$, about 15 to 25 $Al_2O_3$ and about 2 to 6 $Li_2O$, together with about 1.5 to 4 weight percent of nucleating agents selected from one or more of $TiO_2$, $ZrO_2$ and $SnO_2$, can be employed. Preferably, not more than about 2.5 weight percent $TiO_2$ is usually used or the crystallization is undesirably rapid to be compatible with the fullest expansion of the tubes in the bloating process. Other ingredients can be present in small amounts, as is understood in the art, such as even as much as four or five weight percent ZnO, up to as much as 3 or 4 weight percent CaO, up to as much as 8 weight percent MgO, and up to as much as 5 weight percent BaO, so long as the silica plus alumina plus lithia and the nucleating agent(s) are at least about 85, usually 90, weight percent of the total glass, and the glass composition will thermally crystallize to a glass-ceramic having the desired low expansion of $< 12$ to $+12 \times 10^{-7}/°C$. Exemplary compositions which can be used in the process of the invention include those compositions disclosed in U.S. Pat. No. 3,380,818, those compositions disclosed in U.S. Ser. No. 464,147 filed June 15, 1965, and the corresponding British patents 1,124,001 and 1,124,002, dated Dec. 9, 1968, and also those compositions disclosed in application Ser. No. 866,168 filed Oct. 13, 1969, and corresponding Netherlands printed Pat. application 6,805,259, the last-named being especially suitable.

In any event, the thermally crystallizable glass tubings in the lithia-alumina-silica field containing nucleating agents as before described, are assembled as previously set forth and the constrained bundles of sealed tubing (containing a heat-expansible fluid) are heated at any suitable rate that will not thermally shock the tubing up to a temperature range in the maximum nucleating range of the glass. The maximum nucleation range can be determined for all such glasses by the general method outlined in Smith Pat. No. 3,380,818 beginning at column 9, line 54. For the process of the present invention where sealing is to be effected or initiated while nucleation is occurring, it is preferred that the assembled tubes be heated in the range 50° to 250° above the annealing point for a period of 1 hour or more. This time can be extended to 10 or 20 hours, and even longer times are not harmful. During this time of heating in such temperature range nucleation is effected, as well as fusion aided by pressure exerted by expansion of the entrapped fluid. Thereafter, the temperature is raised to a higher temperature than the first heating range, which higher temperature is at least 200° F. above the annealing point temperature or may be as high as the final crystallization temperature (usually 1800 to 2300° F.). The final crystallization can be effected at any such temperature range higher than the nucleation-expansion-fusion temperature (50 to 250° F. above the annealing point temperature) and can be as low as 200° F. above the annealing point or as high as 2300° F. or as high as the upper liquidus temperature. If the final crystallization is effected at temperatures no more than 400 or 500° F. above the annealing point, then the product will not have as high temperature stability as is desired for use at extremely high temperatures but the product will in general be a lower expansion glass-ceramic. In any event, in this second stage of heating further expansion and the beginning of crystallization are effected, followed by the completion of crystallization on continued heating to a degree such that the matrix material has an expansion in the range from $-12$ to $+12 \times 10^{-7}/°$ C. over the range 0–300° C. While the temperature may be raised directly to the final crystallization temperature at a furnace heating rate of at least 50° F. per hour, it is usually preferred to allow crystallization to be effected slowly while further expansion and concomitant fusion are being effected by having an intermediate step between the first nucleation-and-fusion temperature range and the final crystallization temperature, which range is usually from 200° F. to about 500° F. above the annealing point of the original glass. Exemplary holding times in this intermediate range are from 1 to 8 hours, after which the assembly is heated up to the final crystallization temperature, usually in the range of from about 1800 to 2300° F. Obviously, no specific heat treatment instructions can expansion. given suitable for all thermally crystallizable glass compositions. As is well-known, glass-ceramics do not have adequate strength if they are not sufficiently nucleated before crystals are allowed to grow appreciably in size, so that routine experiments known to those skilled in art are used to determine what length of time is best to obtain an adequate number of crystallization centers or nuclei in the glass in the nucleation temperature range of 50 to 250° F. above the annealing point. Another point that must be kept in mind is that, if it is an object to obtain appreciable expansion beyond that necessary to get good fusion between the tubes, in other words to get appreciable reshaping of the tubes to fill the interstices between tubings, one should not raise the temperature too slowly when going from the nucleation temperature range to the intermediate range, since a rigid crystalline network may begin to set in and prevent further expansion. Some compositions can be heated at a rate as low as 50° F. per hour to this intermediate temperature range and still get sufficient expansion of the tubing effective to form hexagonal tubes (round tubes used in close-packed configuration). On the other hand, some compositions have been found not to fully expand unless the heating rate from the initial nucleation-fusion temperature range to the intermediate temperature range is on the order of at least 200° F. per hour and preferably at least 300° F. per hour.

The length of time of heating in the final crystallization temperature range of 1800° F. to about 2300° F. is from one-half hour to 5 or 6 hours, although longer times are in no way deleterious. After the crystallization has been completed, the structure can be cooled at furnace rate or in air because the structure is of such low expansion that thermal shock will not harm it.

After the heat treatment just described, the matrix may now be cooled and the sealed ends of the tubes cut or ground away to open each tube to atmospheric pressure. Alternatively, if the intermediate step of heat treating is employed, as is usually the case, the heat treatment can be interrupted after this intermediate step and cooled somewhat or even cooled to room temperature, and the ends of the tubes cut or ground away and opened to atmospheric pressure. Then the assembly can be heated up again into the final crystallization heat treatment range, where further crystallization is effected. As will be understood by those skilled in the art, the crystals after this second stage of heat treatment may be in the beta-eucryptite or beta-eucryptite-like state, as is referred to in the referenced Smith Pat. No. 3,380,818, and already be highly crystallized and of a low expansion. The final heat treatment will cause further crystallization and conversion of the eucryptite-like crystals to beta-spodumene or beta-spodumene-like crystals, as is also described in the cited Smith patent.

In a preferred embodiment of the invention, the core assembly or matrix comprises a bundle of integrally fused tubes forming a series of smooth, longitudinal, parallel passageways therethrough, as illustrated in FIGS. 1 and 3, wherein the walls defining the passageways 1. have essentially zero porosity;
2. consist essentially of an inorganic crystalline oxide ceramic material;
3. have an average coefficient of lineal thermal expansion of about $-12$ to $+12 \times 10^{-7}/°C$. over the range 0–300° C and preferably $-5$ to $+5 \times 10^{-7}/°C$. over such range; and
4. a thermal conductivity of preferably less than 0.01 cal/cm²/sec/cm/° C. at 400° C.

The inner diameter of the tubes can be within the range of about 0.01 to 0.25 inch, usually 0.02 to 0.1 inch, although tubes having a larger inner diameter of up to 1 inch, or even larger, can be used. Wall thickness is related to the open frontal or cross-sectional area of the matrix formed of such tubes, as more fully described in copending application Ser. No. 30,859 filed April 22, 1970, and assigned to the same assignee as the present application. Such description is incorporated herein by reference. A frontal area of at least 60 percent is preferred, which means that the ratio of inner diameter of the tubes or passageways to the thickness of the wall portions common to adjacent fused tubes is at least 3 and usually at least 3.6. The ratio of the inner diameter of individual starting material tubes to their wall thickness is at least 6, usually at least 7.2.

The inner surfaces of the glass-ceramic passageways, of course, act as solid contact catalysts for the gas effluents and thus assist in the further combustion of the exhaust gases. It will be understood that the larger the inner diameter of the tubes, the smaller the total surface area available to the gas effluent passing through the passageways, resulting in a reduced contact catalytic effect due to the reduced area of contact. On the other hand, the reduced heat transfer area afforded by less surface contact with larger tubes tends to decrease the heat up time of the engine effluent gases on initial startup of a cold engine.

In another embodiment of the invention, catalysts known to assist in conversion of certain of the by-products, such as hydrocarbons and CO, to harmless ingredients, can be coated on the walls of the passageways by methods known in the art. Among such catalysts are the noble metals and particularly platinum, which can be applied as by vacuum plating or by pyrolysis of organic compounds of such metals, whereby the metal adheres to the glass-ceramic surface.

Figure 12:
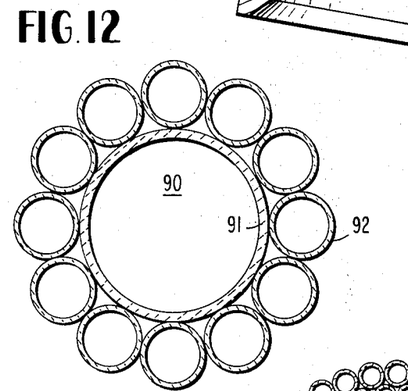
FIG. 12 is a sectional view of another embodiment of an inner core for the exhaust reactor of the invention.

In lieu of the core assembly 10 or 83, other core assembly structures coming within the scope of the invention can be utilized in forming exhaust reactors of the type illustrated in FIGS. 7 and 11. For example, in the embodiment of the invention illustrated in FIG. 12, there is disclosed a core assembly 90 which consists of an inner tubular member 91 having one layer of longitudinally extending tubes 92 which are disposed about and completely surrounding tubular member 91. Thus, the "matrix" can comprise a single layer of tubes defining the second reaction zone. In the preferred embodiment, the tubes and member are glass-ceramic made from a thermally crystallizable glass composition. The size of the tubes will be determined by the amount of support which the tubes 92 give to the inner tubular member 91 and to the inner surface area to be provided by the tubes, where such area acts as solid contact catalyst for one or more of the reactions of the gases passing therethrough. For example, an inner tubular member 91 having a three inch diameter can have a single layer of tubes 92 fused thereto to form a monolithic structure wherein each of the tubes has an inner diameter of about 1 inch. Where it is desired to decrease the heat transfer area and thus reduce the quenching of the gases passing through the second reaction zone, the embodiment of FIG. 13 or of FIG. 14 is especially useful, where the matrix tubes supporting the central tube are of an inner diameter of about 0.2 to 1 inch.

The core assembly 90 can be formed in the same manner as the core assembly illustrated in FIGS. 1–3 whereby the tubes 92 are sealed at each end, with a fluid medium such as air trapped therein. After being placed about inner tubular member 92 in a mold, the tubes 92 and member 91 are subjected to heat sufficient to soften the glass walls of the tubes 92 and to cause the fluid medium within each tube to expand and thus bloat the tubes outwardly so that adjoining contacting surfaces of the tubes fuse together and each tube is also fused to tubular member 91 as illustrated in FIG. 13.

The inner core 90 can be shaped in the manner illustrated in FIG. 3 and have inlet and outlet openings formed therein, as illustrated in FIG. 4. Since the outlet opening only has to go through a single layer of tubes 92, the number of passageways in communication with such outlet opening can be increased by merely cutting through additional contacting wall portions of tubes 92, for example as was done in the core assembly shown in FIG. 7.

Figure 13:
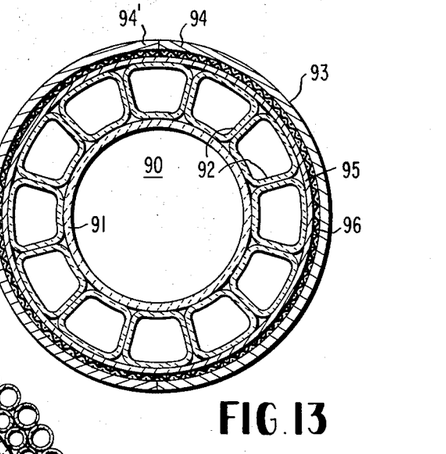
FIG. 13 is a sectional view through another embodiment of the thermal reactor of the invention.
Figure 14:
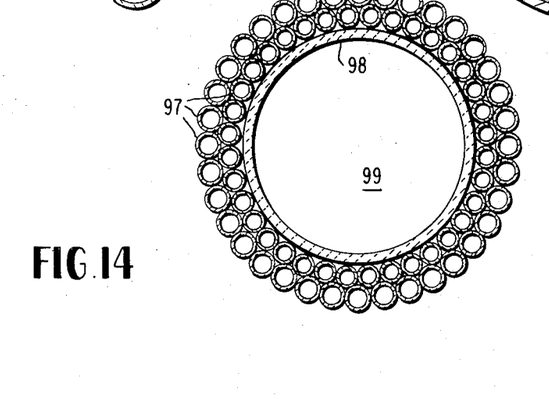
FIG. 14 is a sectional view of still another embodiment of an inner core for the exhaust reactor of the invention.

As shown in FIG. 13, the core assembly 90 is disposed within a casing 93 consisting of two hemicylindrical mating members 94, 94'. An insulating material 95, resistant to the high temperatures to which the inner core is heated in operation, is placed about inner core 90 and a woven spring mesh 96 is disposed about insulating material 95. This spring mesh 96 functions in the same manner as does spring mesh 47 in the embodiment illustrated in FIGS. 5–8. Thus, the hot exhaust gases enter the first reaction zone defined by the interior of the tubular member 91, flow in either direction to the outer ends of member 91 and enter passageways defined by the tubes 92, many or all of which are in communication with the outlet port (not shown) of the exhaust reactor.

Because of the presence of the insulating material 95 about the inner core, the heat which is conducted outwardly to the spring mesh 96 and the casing 93 is greatly reduced as compared to the heat within the core assembly 90. It is contemplated that in lieu of the insulating material, a plurality of tubes having each end sealed or blocked could be fused to the exterior surfaces of tubes 92 about the periphery of the inner core and these sealed tubes would effectively insulate the heat of the core assembly from the exterior of the core assembly, i.e., spring mesh 96 and casing 93. The number of sealed tubes necessary to effectively insulate the core assembly 90 will vary with the size thereof, the size of member 91, the size of tubes 92, and the temperatures to which the core assembly 90 will be subjected to during operation of the exhaust reactor.

As seen in the embodiment illustrated in FIG. 14, a matrix of two layers of glass-ceramic tubes 97 are fused to each other and to tubular member 98 and form a core assembly 99 for use in an exhaust reactor in lieu of core assembly 10 shown in FIGS. 5–8 of the drawing. The outer layer of tubes 97 can have their ends sealed or blocked in the manner shown in FIGS. 5 and 6 to provide an insulating layer for the core. Alternatively, the number of layers of tubes 97 comprising the matrix can be increased or a plurality of tubes 12 (not shown) can be disposed about and fused to themselves and the outermost surfaces of tubes 97 along all longitudinally contacting surfaces. Such plurality of tubes 12 can have their ends sealed or blocked to provide the insulating tubes for the core assembly 98.

While the thermal reactor of the invention has been described in terms of glass-ceramic components for the core assembly, it is within the scope of the invention to have the tubular member 11 and the tubes 12 formed of suitable metals capable of withstanding the high operating temperatures of the reactor. Among such metals are titanium, nickel, and nickel-steel alloys. Such metal tubes can be readily bonded or fused to each other and to the tubular member so as to provide the necessary support for the inner tubular member. Again, the layers of metal tubes about the periphery of the core assembly which are closed off to the passage of exhaust gases will act as an insulating layer for the reactor zones within the core, although not as effectively as the glass-ceramic tubes which have very low heat conductivity. Further, when a metal matrix and inner tubular reaction zone tubes are used, the insulation around the matrix can be a layer of ordinary inorganic oxide insulation material such as asbestos or the like.

It has been found that the flow of the exhaust gases from a combustion engine through the thermal reactor of the invention not only results in more combustion of the gas effluents and less emission of harmful pollutants into the atmosphere, but the structure of the reactor is such that it does decrease the noise usually made by such gases as they exit from the engine. The reactor, in effect, also acts as a silencer or muffler for such gases.

Air entering inlets 25 (by means not shown) which mixes with the hot gases, assists in the further combustion of the gases within the reactor. Because of the low heat transfer coefficient of the glass-ceramic components of the reactor, there is a quick heat-up of the components upon the entry of the hot gases (with the added air) therein, which assists in the initial combustion of the gases in the reactor. In prior art reactors where such quick heat-up was not possible, the combustion gases entering the reactor upon the starting of the combustion engine, merely passed through the reactor substantially unchanged and entered the atmosphere as pollutants, just as if there had been no reactor, until such time that the reactor had heated to a temperature sufficient to allow combustion. The ceramic exhaust reactor shown in FIGS. 4-10 was tested preliminarily, mounted on one side of a Ford V-8 truck engine. On the other side was mounted a prior art design metal exhaust reactor which was tested simultaneously.

The test revealed that an important advantage of the reactor of the invention was that after 20 seconds operation starting with a cold engine, the gases inside the first reaction zone were about 200° F hotter than in the metal reactor.

Furthermore, using the 1968–1970 Federal Test Procedure, results for the seventh cycle showed that the exhaust gases from the reactor of the invention contained 6 ppm hydrocarbons and 0.22 mole percent CO, compared to 15 ppm hydrocarbons and 0.32 mole percent CO from the metal reactor.

Another important advantage of the reactor of the invention so tested is the exterior of the metal casing was about 300° F cooler than the casing of the metal reactor being tested on the other side of the engine. This is also important, not only from the standpoint of efficiency of the exhaust reactor combustion reactions, but also from the standpoint of the level of temperatures under the hood of a truck or automobile, which temperatures are already approaching undesirably high levels in modern automobiles and trucks, even without the addition of an exhaust reactor device under the hood.

As used herein in the claims appended hereto, the term "glass-ceramic" is an inorganic crystalline oxide ceramic material containing a multiplicity of extremely small inorganic oxide crystals in random orientation throughout the mass of the material, which glass-ceramic is formed by the thermal in situ bulk crystallization of a glass.

While there have been shown and described and pointed out the fundamental novel features of the invention with a reference to preferred embodiments thereof, those skilled in the art will recognize that various changes, substitutions, omissions, and modifications in the structure illustrated may be made by those skilled in the art without departing from the spirit of the invention.

What is claimed is:

1. An exhaust reactor for a combustion engine comprising
an essentially tubular member for receiving the flow of hot gas effluents from said combustion engine and defining a first reaction zone for said effluents, a matrix comprising a plurality of parallel tubes extending longitudinally of and disposed about said tubular member, said tubular member and said tubes being formed of an inorganic crystalline oxide ceramic material,
said tubes being fused together and to said tubular member along their contacting lengths and forming a rigid support for said tubular member, a plurality of said tubes disposed about said tubular member having smooth, open passageways which are in communication with said first reaction zone defined by said tubular member and receive the flow of hot gas effluents therefrom, said tubes with said open passageways defining a second reaction zone for said gas effluents flowing therethrough, and at least one layer of said tubes forming the outer periphery of said matrix being closed to the flow of gases therethrough, thus insulating said reaction zones from loss of heat.

2. The exhaust reactor as defined in claim 1 including an end cap secured to one end of said matrix, the inner surface area of said end cap defining a chamber for receiving hot gas effluents from said first reaction zone and prior to said effluents entering said second reaction zone.

3. The exhaust reactor as defined in claim 2 wherein each end of said matrix has one of said end caps secured thereto.

4. The exhaust reactor as defined in claim 2 wherein said tubular member, said plurality of tubes and said end caps consist essentially of an inorganic crystalline oxide ceramic material.

5. The exhaust reactor as defined in claim 4 wherein said tubular member, said plurality of tubes and said end caps are formed of an inorganic crystalline oxide ceramic material having substantially the same coefficient of thermal expansion.

6. The exhaust reactor as defined in claim 2 wherein a portion of the end cap is in sealing contact with the ends of at least one layer of tubes about the periphery of said matrix and closing said tubes to the passage of hot gas effluents therethrough, said closed tubes forming an insulating layer about said matrix.

7. An exhaust reactor for receiving the flow of hot gas effluents from a combustion engine comprising
a casing,
a core assembly supported within said casing,
said casing having at least one inlet port and an outlet port,
said core assembly comprising
an essentially tubular member defining a first reaction zone for the hot gas effluents and
a matrix comprising a plurality of parallel tubes extending longitudinally of and disposed about said tubular member,
said tubes being bonded together and to said tubular member along the contacting lengths and forming a rigid support for said tubular member,
a plurality of said tubes disposed about said tubular member having open passageways which are in communication with said first reaction zone and receive the flow of hot gas effluents therefrom,
said tubes with said open passageways defining a second reaction zone for said gas effluents flowing therethrough,
at least one inlet port extending through the surface of the matrix and communicating with said first reaction zone,
said matrix inlet port being in communication with the inlet port of said casing to permit the flow of hot gas effluents from said combustion engine into said first reaction zone,
an outlet port extending through the outer periphery of said matrix and communicating with the plurality of passageways formed by said tubes defining said second reaction zone,
said matrix outlet port being in communication with the outlet port of said casing, and
an insulating layer disposed about the periphery of said matrix.

8. The exhaust reactor as defined in claim 7 including an end cap secured to one end of said core assembly, the inner surface of said end cap defining a chamber for receiving hot gas effluents from said first reaction zone prior to said effluents entering said second reaction zone.

9. The exhaust reactor as defined in claim 8 wherein a second end cap is secured to the other end of said core assembly.

10. The exhaust reactor as defined in claim 7 wherein said insulating layer disposed about the periphery of said matrix comprises at least one layer of said tubes forming the outer periphery of said matrix being closed to the flow of hot gas effluents therethrough, thus insulating said reaction chambers from loss of heat.

11. The exhaust reactor as defined in claim 9 wherein said casing is a metal casing and said core assembly is formed of an inorganic crystalline oxide ceramic having a coefficient of thermal expansion which is substantially below that of the metal casing.

12. The exhaust reactor as defined in claim 9 wherein the metal of said casing is cast iron.

13. An integral, monolithic exhaust reactor for a combustion engine including a first reaction zone comprising an elongated tube for receiving the flow of hot gas effluents from said combustion engine, a matrix comprising a plurality of parallel tubes extending longitudinally of and disposed about said first tubular reaction zone and being bonded to said elongated tube, said parallel tubes being bonded together in said matrix and forming a rigid support for said first reaction zone, a plurality of said matrix tubes disposed about said first reaction zone having open passageways which are in communication with said first reaction zone to receive the flow of gas effluents therefrom, said matrix tubes with said open passageways defining a second reaction zone for the gas effluents, and outlet means communicating with said second reaction zone to permit passage of gas effluents therefrom, and at least one layer of parallel tubes located about the outer periphery of said matrix being closed to the flow of gases therethrough, thus insulating said exhaust reactor from loss of heat.

14. An integral, monolithic exhaust reactor for a combustion engine including a first reaction zone comprising an elongated tube for receiving the flow of hot gas effluents from said combustion engine, a matrix comprising a plurality of parallel tubes extending longitudinally of and disposed about said first tubular reaction zone and being bonded to said elongated tube, said parallel tubes being bonded together in said matrix and forming a rigid support for said first reaction zone, a plurality of said matrix tubes disposed about said first reaction zone having open passageways which are in communication with said first reaction zone to receive the flow of gas effluents therefrom, said matrix tubes with said open passageways defining a second reaction zone for the gas effluents, and outlet means communicating with said second reaction zone to permit passage of gas effluents therefrom, said longitudinally extending first reaction zone being off center within the matrix of longitudinally extending parallel tubes.

15. The exhaust reactor as defined in claim 14 wherein said outlet means is positioned through the periphery of said matrix formed by said parallel tubes at a place which is furthest removed from the outer surface of said first reaction zone.

16. An exhaust reactor for receiving the flow of hot gas effluents from a combustion engine comprising a casing, a core assembly supported within said casing, said casing having at least one inlet port and an outlet port, said core assembly comprising an essentially tubular member defining a first reaction zone for the hot gas effluents and a matrix comprising a plurality of parallel tubes extending longitudinally of and disposed about said tubular member, said tubes being bonded together and to said tubular member along the contacting lengths and forming a rigid support for said tubular member, a plurality of said tubes disposed about said tubular member having open passageways which are in communication with said first reaction zone and receive the flow of hot gas effluents therefrom, said tubes with said open passageways defining a second reaction zone for said gas effluents flowing therethrough, at least one inlet port extending through the matrix and communicating with said first reaction zone, said matrix inlet port being in communication with the inlet port of said casing to permit the flow of hot gas effluents from said combustion engine into said first reaction zone, an outlet port extending through the outer periphery of said matrix and communicating with the plurality of passageways formed by said tubes defining said second reaction zone, said matrix outlet port being in communication with the outlet port of said casing.

17. The exhaust reactor as defined in claim 16 which additionally comprises an insulating layer disposed about the periphery of said matrix, wherein said insulating layer disposed about the periphery of said matrix comprises at least one layer of said tubes forming the outer periphery of said matrix being closed to the flow of hot gas effluents therethrough, thus insulating said reaction chamber from loss of heat.

* * * * *